United States Patent [19]
Lorenz

[11] Patent Number: 5,947,532
[45] Date of Patent: Sep. 7, 1999

[54] STAB-TYPE COUPLING FOR CONDUIT

[75] Inventor: James M. Lorenz, Madison, Ohio

[73] Assignee: Perfection Corporation, Cleveland, Ohio

[21] Appl. No.: 08/987,034

[22] Filed: Dec. 9, 1997

[51] Int. Cl.[6] .................................................. F16L 17/02
[52] U.S. Cl. .......................... 285/321; 285/323; 285/342
[58] Field of Search .................................... 285/342, 322, 285/323, 328, 337, 104, 105, 339, 321

[56] References Cited

U.S. PATENT DOCUMENTS

| | | | |
|---|---|---|---|
| 3,384,392 | 5/1968 | Gilchrist | 285/105 |
| 3,733,093 | 5/1973 | Seiler | 285/342 |
| 3,815,940 | 6/1974 | Luckenbill . | |
| 3,920,270 | 11/1975 | Babb, Jr. | 285/339 |
| 4,068,866 | 1/1978 | Saha . | |
| 4,229,025 | 10/1980 | Volgstadt et al. . | |
| 4,407,526 | 10/1983 | Cicenas . | |
| 4,568,114 | 2/1986 | Konrad | 285/342 |
| 4,647,086 | 3/1987 | Maxwell et al. . | |
| 4,805,932 | 2/1989 | Imhof et al. | 285/104 |
| 5,029,908 | 7/1991 | Belisaire . | |
| 5,090,741 | 2/1992 | Yokomatsu et al. | 285/323 |
| 5,150,925 | 9/1992 | Yokomatsu et al. . | |
| 5,335,946 | 8/1994 | Dent et al. | 285/342 |
| 5,366,260 | 11/1994 | Wartluft | 285/323 |
| 5,803,513 | 9/1998 | Richardson | 285/337 |

FOREIGN PATENT DOCUMENTS 970887  9/1964  United Kingdom .

*Primary Examiner*—Eric K. Nicholson
*Attorney, Agent, or Firm*—Fay, Sharpe, Beall, Fagan, Minnich & McKee, L.L.P.

[57] ABSTRACT

A conduit coupling having a body with an axially extending bore formed therethrough from a first end to a second end. The bore is defined by an inner wall including a frusto-conical surface converging toward the body first end. A radially constrictible and generally annular retaining collet is positioned in the bore. The collet includes an outer frusto-conical surface mating with the frusto-conical surface defined by the inner wall and is axially movable relative thereto. The collet has an inner toothed surface defining a collet inner diameter and at least two radially inwardly extending bite-teeth defining therebetween a distance less than the collet inner diameter and less than an outer diameter of a conduit inserted into the bore so that the bite-teeth engage an outer surface of the conduit. In this manner, upon axial outward movement of the conduit, the frusto-conical surface of the collet bears against the frusto-conical surface of the body inner wall to radially constrict the collet. The inner-toothed surface of the radially constricted collet firmly engages the conduit outer surface to prevent the withdrawal of the conduit from the bore. The coupling, which has both single and double-ended configurations, provides unobstructed and reliable communication between conduits or between a conduit and a piece of equipment. The inwardly directed and circumferentially spaced bite-teeth prevent slippage between a conduit and the collet, but do not significantly interfere with conduit insertion into the coupling.

17 Claims, 3 Drawing Sheets

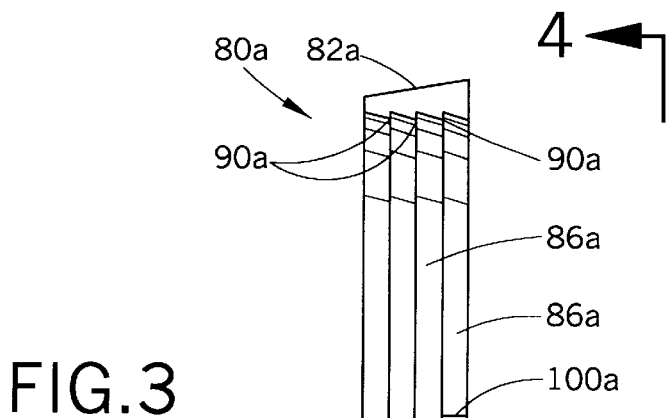
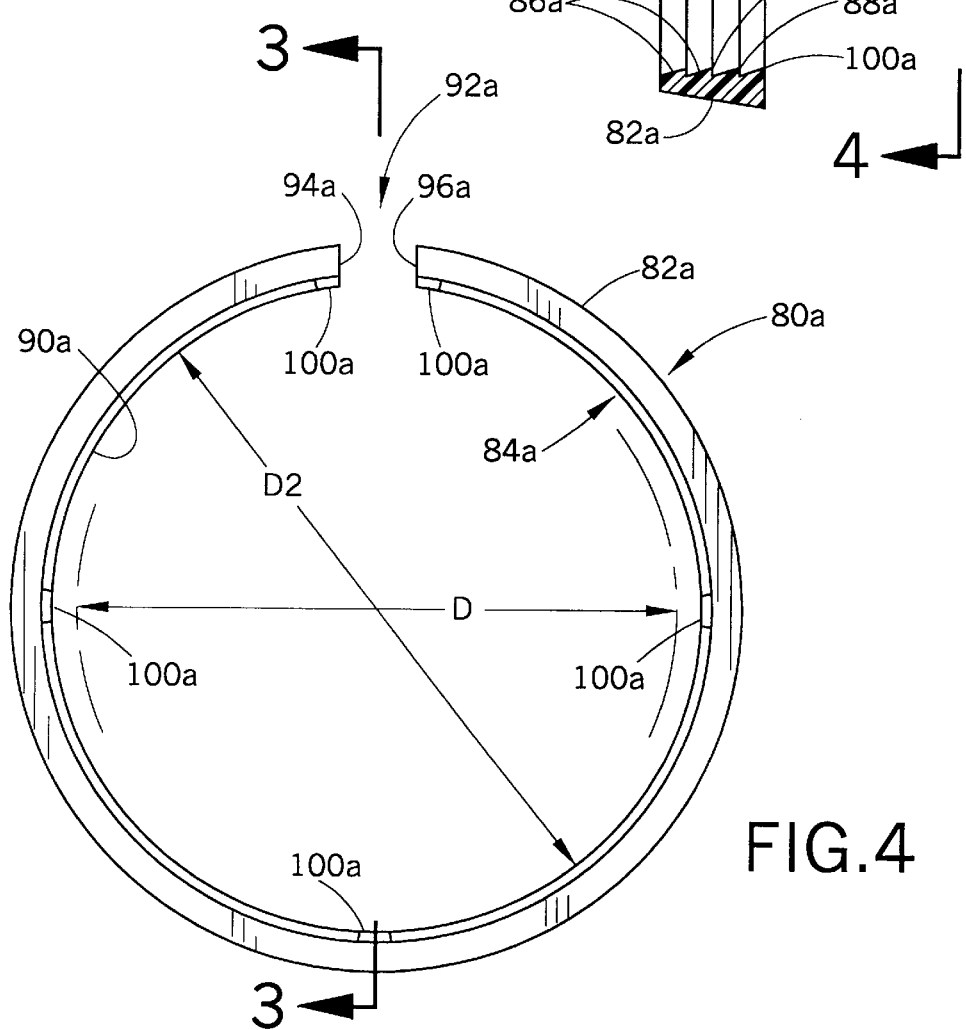

STAB-TYPE COUPLING FOR CONDUIT

BACKGROUND OF THE INVENTION

This invention pertains to the art of conduit couplings, and more particularly to stab-type couplings for use in conjunction with smooth-walled conduits housing optical fibers and other data carriers such as cables and the like. Of course, it will be appreciated that the invention has broader application to coupling pipes, tubes, hoses, and other articles, and may be advantageously used in other environments and applications.

Fiber-optic cables typically consist of multiple optic fibers or bundles, together with various strengthening and structural members, surrounded by an outer protective dielectric jacket. To further protect a fiber-optic cable, especially when it is installed underground or in other harsh environments, the cable is threaded through lengths of conduit. Suitable plastic conduit includes polyethylene (PE), polyvinyl chloride (PVC), and polybutylene (PB).

Stab-type couplings permit quick and easy connection of pipes, tubes, or other conduit to a piece of equipment or to another conduit. Conduit is simply cut at a right angle to its length to form a transverse end which is inserted or "stabbed" into a coupling body bore. The transverse end of the conduit is forced into the coupling body bore until it abuts a stop member. The coupling includes internal gripping elements that are designed to grip the outer surface of the conduit upon its insertion and prevent its withdrawal. For example, stab-type couplings for fluid conduits are known to include a collet and a tapering sleeve or other element that radially constricts the collet upon the attempted withdrawal of the conduit from the coupling body. Other types of gripping elements include gripper rings, gripper washers, and various spring-type elements.

A problem encountered with known stab-type couplings for conduit is the lack of sufficient conduit gripping force during the initial stages of attempted conduit withdrawal from the coupling body. The gripping elements in known couplings do not sufficiently grip the conduit to halt its movement until after the conduit is pulled a certain distance out of the coupling body to actuate the gripping elements. This freedom of movement results in an unstable connection between the coupling and the conduit and ultimately leads to failed connections.

Various stab-type couplings have incorporated means for preloading or "setting-up" the gripping elements thereof so that outward axial movement of a conduit is limited, even during the initial stages thereof. This requires some gripping element that initially passively grips the conduit, without the need for axial outward motion of conduit. Upon axial outward movement of the conduit, the passive gripping element moves with the conduit and ensures actuation of one or more active gripping elements, such as a collet. While some such couplings, such as that set forth in U.S. Pat. No. 4,229,025 and U.S. Pat. No. 5,150,925 have been found to be effective in fluid handling applications, known fluid couplings are not suitable for use in conjunction with optical fiber and other communications conduit. In particular, these couplings include stiffeners, pistons, plural O-ring seals, and other parts in the coupling body to form an effective fluid-tight seal. Certain of these elements do not significantly interfere with fluid flow, but do interfere with the threading of optical fiber bundles, copper cables, and other data carriers through the conduit and associated coupling as is required for communications applications. Also, there is no elevated internal fluid pressure in a fiber-optic bundle conduit as might be encountered in hydraulic lines and the like. Thus, no seals are required against such internal pressure. Certain known fluid couplings for hydraulic, pneumatic, and other such applications actually rely upon the internal fluid pressure to actuate gripping elements in a piston-like fashion. Of course, such couplings are not suitable for use with conduit of the type used to house optical fiber bundles and the like. Further, each element inside of a coupling increases its cost, both in terms of the parts and the assembly.

Gripping teeth or other elements that grip the outer wall of a conduit even when no axial outward movement of the conduit is present must engage the outer wall of the conduit in an interference fit. However, another drawback associated with known couplings including such gripping elements is that the gripping elements interfere with the proper insertion of a conduit into the coupling. Unless a conduit is fully and properly inserted into a coupling, it will not be effectively retained therein. For example, certain pre-loaded gripping elements engage an entire circumferential region of a conduit. This renders conduit insertion more difficult, but does not provide significant gripping advantages.

Accordingly, it is desirable to develop a new and improved coupling for fiber-optic elements which overcomes the foregoing deficiencies and others while providing better and more advantageous overall results.

SUMMARY OF THE INVENTION

According to the present invention, a new and improved stab coupling for conduit is provided.

In accordance with a first aspect of the invention, a conduit coupling includes a body having an axially extending bore formed therethrough from a first end to a second end. The bore is defined by an inner wall including a frusto-conical surface converging toward the body first end. A radially constrictible and generally annular retaining collet is positioned in the bore. The collet includes an outer frusto-conical surface mating with the frusto-conical surface defined by the inner wall and is axially movable relative thereto. The collet has an inner toothed surface defining a collet inner diameter and at least two radially inwardly extending bite-teeth defining therebetween a distance less than the collet inner diameter and less than an outer diameter of a conduit inserted into the bore so that the bite-teeth engage an outer surface of the conduit. In this manner, upon axial outward movement of the conduit, the frusto-conical surface of the collet bears against the frusto-conical surface of the body inner wall to radially constrict the collet. The inner-toothed surface of the radially constricted collet firmly engages the conduit outer surface to prevent the withdrawal of the conduit from the bore.

In accordance with another aspect of the present invention, a double-ended coupling for connecting and providing unobstructed communication between two conduits includes a body with an axially extending bore formed therethrough from a first end to a second end. The bore is defined by an inner wall including a central shoulder separating the bore into first and second symmetrical conduit receiving recesses, and first and second frusto-conical surfaces converging respectively toward the body first and second ends. First and second radially constrictible and generally annular retaining collets are positioned in the bore. The collets each include an outer frusto-conical surface respectively mating with the first and second frusto-conical surfaces defined by the inner wall and axially movable relative thereto. Each collet has an inner toothed surface defining a collet inner diameter and at least two radially inwardly extending bite-teeth defining therebetween a distance less than the collet inner diameter and less than an outer diameter of first and second conduits inserted respectively into the first and second recesses such that the bite-teeth of the first and second collets respectively engage an outer surface of the first and second conduits. Upon axial outward movement of the first and second conduits, the frusto-conical surfaces of the first and second collets respectively bear against the first and second frusto-conical surfaces of the body inner wall to radially constrict the first and second collets so that the inner-toothed surface of each of the radially constricted collets firmly engages the outer surface of the first and second conduits, respectively, to prevent the withdrawal of the conduits from said bore.

In accordance with another aspect of the invention, a generally annular retaining collet includes an outer frusto-conical surface and an inner toothed surface. The inner-toothed surface includes at least one circumferentially extending tooth defining an inner diameter of the collet. At least two inwardly directed and circumferentially spaced bite teeth are provided on the inner toothed surface and define therebetween a distance less than the collet inner diameter so that an outer surface of a conduit inserted through the inner diameter of the collet is engaged by the at least two inwardly directed and circumferentially spaced bite-teeth.

One advantage of the present invention is that it securely grips a conduit and prevents its withdrawal from the coupling.

Another advantage of the present invention is that it securely grips conduit but does not render conduit insertion into the coupling difficult.

Still another advantage of the present invention is its ease of assembly and use.

A yet further advantage of the present invention is the integration of passive and active gripping elements into a single element without interference therebetween.

Still further benefits and advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components. The drawings are only for purposes of illustrating preferred embodiments and are not to be construed as limiting the invention.

FIG. 3 is a view along line 3—3 of FIG. 4;

FIG. 4 is a view along line 4—4 of FIG. 3 showing a rear elevational view of a retaining collet in accordance with the invention;

DETAILED DESCRIPTION OF THE PREFERRED EMBODIMENTS

Figure 1:
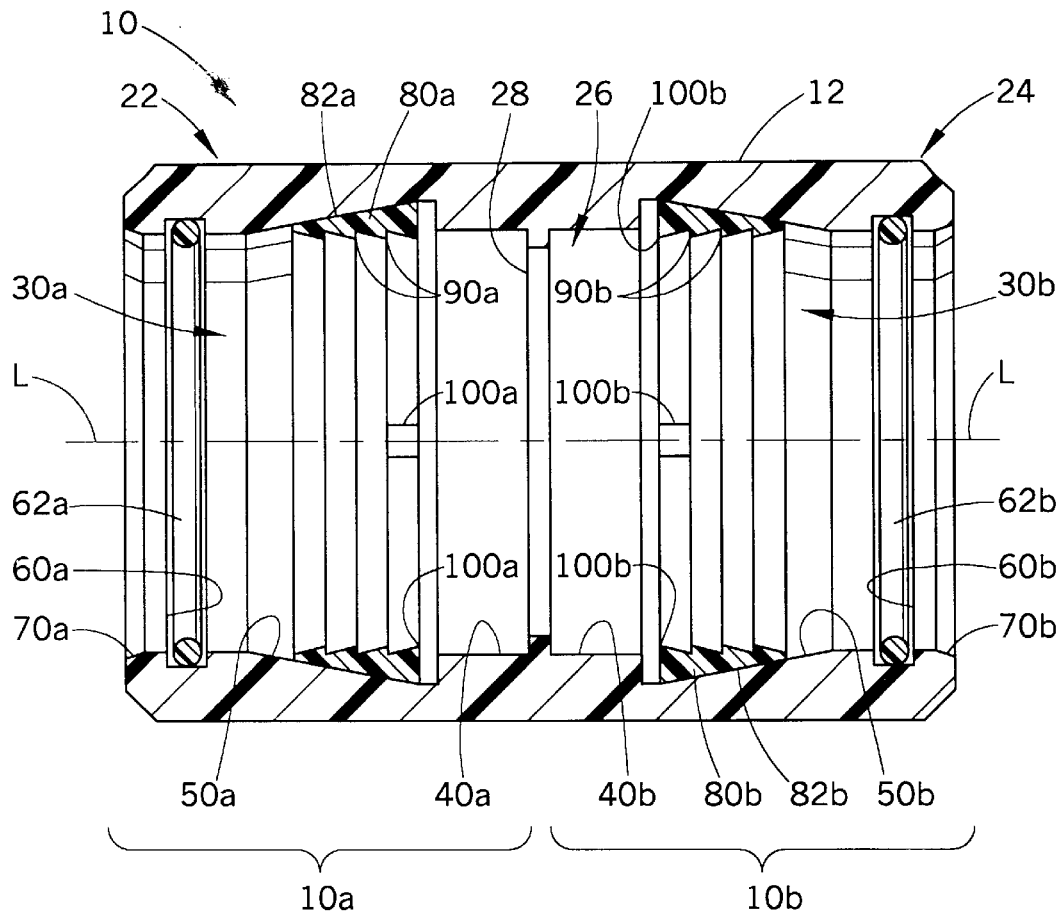
FIG. 1 is an axial cross-sectional view of a double-ended coupling in accordance with the present invention.
Figure 2:
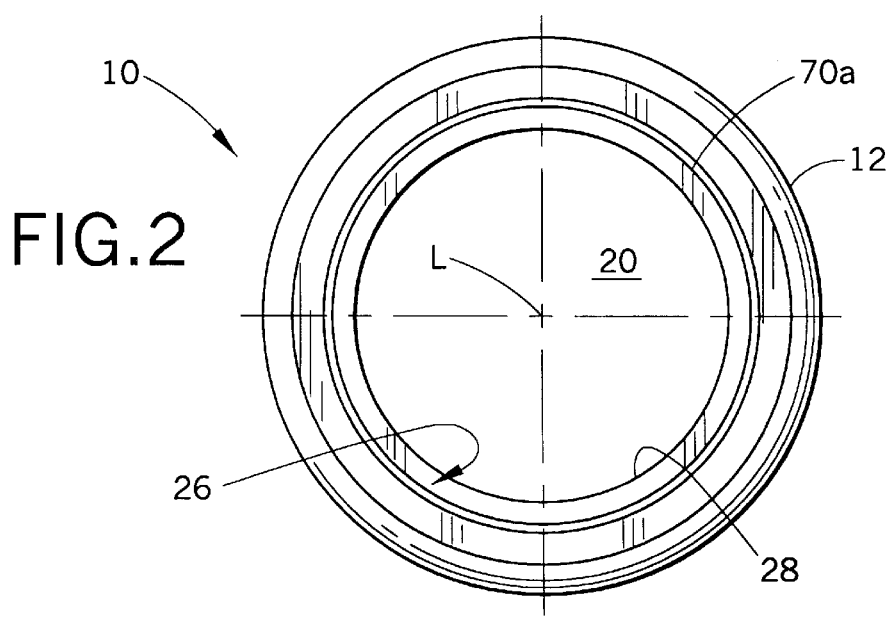
FIG. 2 is an end elevational view of a coupling in accordance with the present invention.

With reference to FIGS. 1 and 2, a double-ended coupling in accordance with the present invention is shown generally at 10. Coupling 10 includes a body 12 made from molded plastic or from any other suitable corrosion resistant material. Coupling 10 is "double-ended" and is used to join two conduit lengths together in communication with each other. As such, coupling 10 includes first and second symmetrical halves 10a, 10b, each of which receives and retains a conduit such that the conduits are joined in communication with each other. For ease of reference, the structure and function of the present invention is described herein with primary reference to the half 10a. Those skilled in the art will recognize that the half 10b has a corresponding structure and function. Reference numbers indicating components of the half 10a include an "a" suffix while corresponding components of the half 10b include like reference numbers with a "b" suffix.

The coupling body 12 includes a through-bore 20 (FIG. 2) formed from a first coupling end 22 to a second coupling end 24 on an axis L. The bore 20 is defined by an inner wall 26 to have a central shoulder 28 separating the halves 10a, 10b and dividing the bore 20 into first and second conduit receiving recesses 30a, 30b. The shoulder 28 acts as a stop-member for a transverse end of a conduit inserted into either recess 30a, 30b. For proper coupling, the conduit transverse end must be fully inserted into a recess 30a, 30b until it abuts the shoulder 28. The shoulder 28 preferably extends radially inward a distance that is less than or equal to the wall thickness of a conduit inserted into the coupling 10 so that the wall does not interfere with the passage of fiber-optic bundles, cables, and the like through the coupling.

With particular reference now to the coupling half 10a, the wall 26 further defines a cylindrical surface 40a that surrounds a cylindrical conduit in a close relationship therewith. The surface 40a a acts to center a conduit in the recess 30a adjacent the shoulder 28. Axially between the surface 40a and the coupling end 22, the bore inner wall 26 defines a frusto-conical surface 50a which converges toward the coupling end 22. Axially between the frusto-conical surface 50a and the coupling end 22, the wall defines an inner circumferential groove 60a which receives an elastomeric O-ring seal 62a or the equivalent. The O-ring seal 62a prevents the entrance of dirt, water, and other contaminants into the recess 30a between the wall 26 and the outer diameter of a conduit positioned in the recess. More particularly, the O-ring seal 62a prevents dirt and water from entering the conduit at its inner transverse end and contaminating the fiber optic or other data carriers housed therein. Further, the O-ring seal prevents the fouling of the coupling itself with dirt and other contaminants which can interference with its gripping action as is described below. Finally, at the coupling end 22, the wall 26 defines a chamfered surface 70a which widens the entrance to the bore at the coupling end 22 to facilitate the insertion of a conduit transverse end into the recess 30a by centering the conduit relative to the recess.

A radially constrictible and expandable annular retaining collet 80a is positioned in the recess 30a such that an outer frusto-conical surface 82a thereof lies adjacent and mates with the frusto-conical surface 50a in the recess 30a. The surfaces 50a, 82a are generally complimentary, but the collet surface 82a is preferably not coextensive with the surface 50a. Thus, the axial position of the collet 80a in the recess is adjustable as limited by the extent of the surface 50a and the limit of radial constriction of the collet 80a.

Referring also to FIGS. 3 and 4, the inner diameter D2 of the collet 80a is defined by a toothed gripping surface 84a. The toothed surface 84a is itself defined by plurality of ramp surface 86a which diverge in the direction of the collet end 22 and periodic radial surfaces 88a which interrupt the ramp surfaces 86a to define a plurality of circumferentially extending edges 90a which engage the outer diameter of a conduit inserted into the recess 30a. Preferably, the orientation of the edges 90a is away from the coupling end 22 to more effectively resist outward movement of a conduit.

With particular reference to FIG. 4, it can be seen that the retaining collet 80a is not a complete annulus. The collet 80a is split through its axial length such that a circumferential gap 92a is formed therein. The gap 92a allows the collet to radially constrict until the end faces 94a, 96a defining the gap abut, and allows the collet to expand as limited by the diameter of the bore 20 in the region of the surface 50a. The collet is preferably fabricated from acetal copolymer and is resilient so that after its radial constriction or expansion, it returns to a relaxed diameter as shown in FIG. 4.

In addition to the edges 90a, the toothed surface 84a of the collet includes one or more radially inwardly directed and circumferentially spaced bite-teeth 100a. Bite-teeth 100a are preferably arranged in generally opposing relationships, i.e., approximately 180° spaced from another tooth 100a on the collet inner diameter, to define therebetween a distance D which is at least slightly less than the outer diameter of a conduit inserted the recess 30a, even when the collet 80a is radially expanded to the fullest extent possible within the bore 20. The collet inner diameter distance D2 defined by the tooth edges 90a is preferably slightly greater than the distance D between opposing bite-teeth 100a, to accommodate a conduit without significant interference between the edges 90a and the conduit outer surface when the collet is fully radially expanded as limited by the bore 20. By limiting the interference between the teeth edges 90a and the conduit, the teeth edges 90a will not flatten or otherwise deform over time which reduces their effectiveness. Also, it is preferable that a bite-tooth 100a be provided on both circumferential sides of the gap 92, immediately adjacent the faces 94a, 96a to facilitate expansion of the gap during conduit insertion as is described below.

Figure 6:
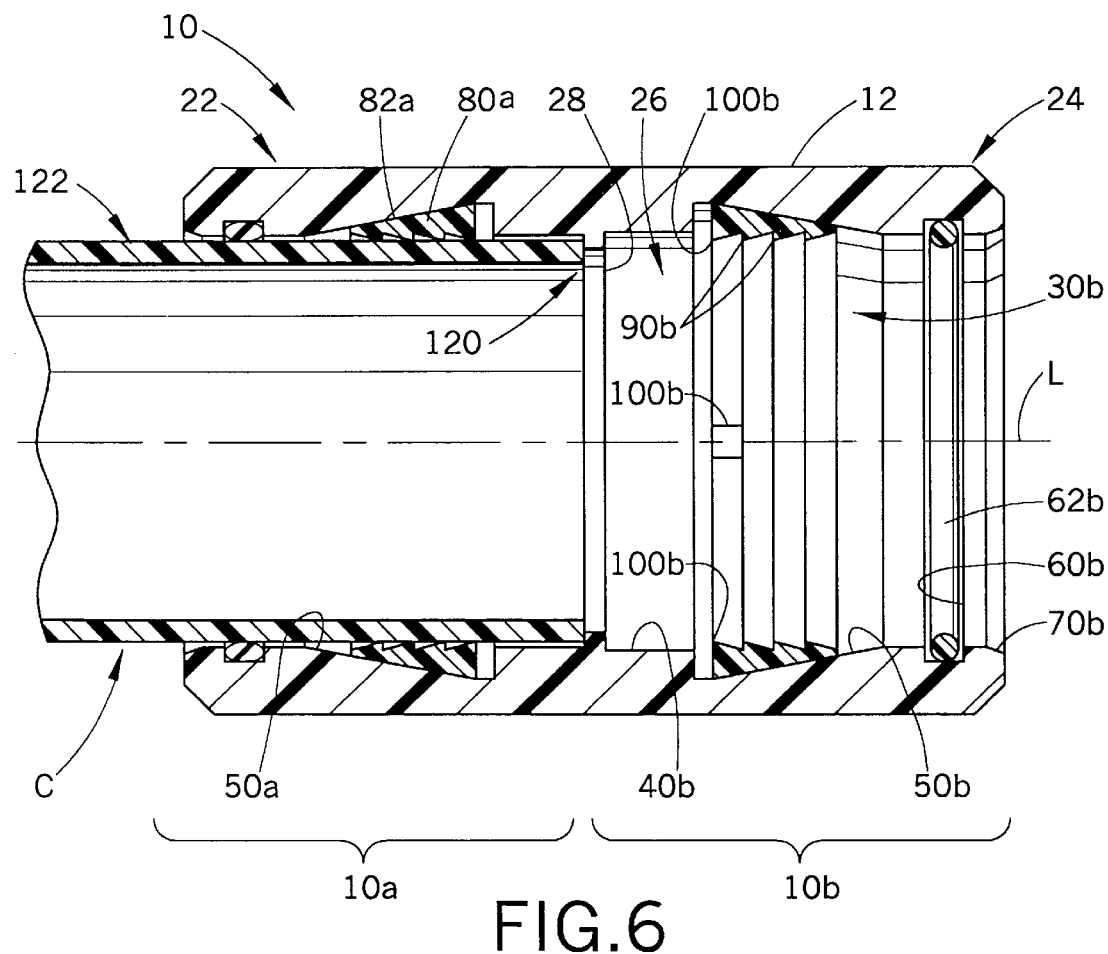

With reference now also to FIG. 6, in operation, a conduit C is cut transverse to its length to form a conduit transverse end 120 which is inserted into the recess 30a until the conduit transverse end 120 abuts the shoulder 28. During the conduit insertion, the outer diameter or outer surface 122 of the conduit contacts the bite-teeth 100a and the collet moves axially inward toward the shoulder 28. The axial inward movement of the collet 80a, to the extent permitted by the frusto-conical surface 50a, allows the collet to expand radially as required to accommodate the conduit C. The frusto-conical surface 50a of the bore wall 26 and the frusto-conical surface 82a of the collet 80a remain in contact with each other. Further, the bite-teeth 100a bite-on and frictionally engage the outer surface 122 of the conduit C. However, because the circumferentially spaced teeth 100a engage only a small portion of the circumference of the conduit C, as opposed to all or nearly all of the circumference, conduit insertion is not unduly inhibited. Further, the opposing relationship of the bite-teeth 100a, and the location of teeth 100a in the region of the gap 92 facilitate the smooth expansion of the collet upon conduit insertion, at least to the extent possible as limited by the frusto-conical surface 50a.

After full insertion of a conduit end 120, any axial outward movement of the conduit C to effect its withdrawal from the recess 30a causes the collet 80a to move axially outward with the conduit due to the presence of the bite-teeth 100a which are engaged with the conduit outer surface 122. Axial outward movement of the collet causes the frusto-conical surface 82a of the collet to bear against the frusto-conical surface 50a of the housing inner wall 26, which results in radially constriction of the collet 80a. Upon radial constriction, the teeth edges 90a firmly bite on the outer surface 122 of the conduit. As the axial conduit pull-out force increases, the retaining force of the collet teeth 90a on the conduit also increases. When the pull-out force subsides, the resilience of the collet 80a results in slight axial inward movement of the collet and a corresponding slight radial expansion which allows the teeth 90a to relax their grip on the conduit C while the teeth 100a remain engaged with the conduit.

The half 10b is symmetrically structured relative to the half 10a and operates in the same fashion to grip a conduit end inserted into the recess 30b. It can be seen in FIG. 1 that when the double-ended coupling 10 is used to connect two conduits, the conduits are connected together and communicate with each other without any obstructions therebetween. This allows optical fiber bundles and other data carriers to be threaded through the coupling 10 without difficulty.

Figure 5:
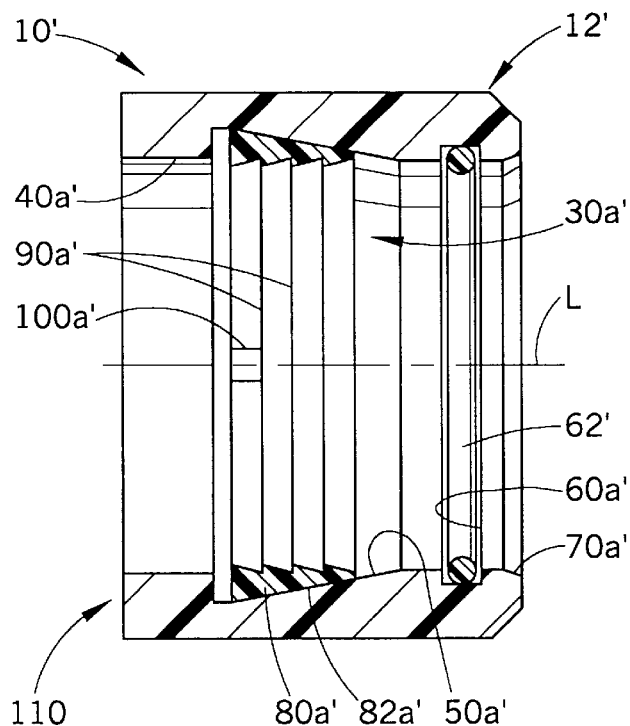
FIG. 5 is an axial cross-sectional view of a single-ended coupling in accordance with the present invention; and, FIG. 6 is an axial cross-sectional view of the coupling of FIG. 1 including a conduit inserted into a first end thereof.

With reference to FIG. 5, a single-ended coupling 10' is shown and is also similar in all respects to the halves 10a, 10b of the coupling 10. Although an inner shoulder may be provided as a part of the single-ended coupling 10', as shown herein, the single ended-coupling includes a rear face 110 which is to be connected to a separate coupling, to a piece of communications equipment, or to any other surface using an adhesive, fusion welding, or any suitable technique. Alternatively, the housing 10' can be provided with threads or other suitable connection means in the region of the rear face 110 to facilitate the connection of the coupling 10' to a mating connector of another coupling or to a piece of electronic equipment. In all other respects, the coupling 10' is identical in structure and function to either half 10a, 10b of the coupling 10 to provide a single-ended conduit coupling.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A stab-type conduit coupling for auto-engaging an associated conduit inserted therein, said coupling comprising:

a body including an axially extending bore formed therethrough from a first end to a second end, said bore defined by an inner wall including a frusto-conical surface converging toward said body first end and adapted to receive an associated conduit through said first end;

a radially constrictible generally annular retaining collet movably positioned in said bore, said collet including an outer frusto-conical surface mating with said frusto-conical surface defined by said inner wall and axially movable relative thereto, said collet having an inner toothed surface defining a collet inner diameter and at least two radially inwardly extending and circumferentially spaced-apart bite-teeth defining therebetween a distance less than said collet inner diameter and less than an outer diameter of an associated conduit inserted into said bore such that said bite-teeth engage an outer surface of said associated conduit simultaneously upon insertion of said associated conduit into said bore whereby, upon axial outward movement of said associated conduit, said collet moves with said conduit so that said frusto-conical surface of said collet bears against said frusto-conical surface of said body inner wall to radially constrict said collet, said inner-toothed surface of said radially constricted collet firmly engaging said conduit outer surface to prevent further withdrawal of said associated conduit from said bore.

2. The coupling as set forth in claim 1 wherein said at least two bite-teeth are positioned approximately 180° opposite each other on said collet inner diameter.

3. The coupling as set forth in claim 1 wherein said generally annular collet includes a circumferential gap defined by first and second end faces, said gap allowing radial constriction and expansion of said collet.

4. A conduit coupling comprising:

a body including an axially extending bore formed therethrough from a first end to a second end, said bore defined by an inner wall including a frusto-conical surface converging toward said body first end;

a radially constrictible generally annular retaining collet positioned in said bore, said collet comprising: (i) an outer frusto-conical surface mating with said frusto-conical surface defined by said inner wall and axially movable relative thereto; (ii) a circumferential gap defined by first and second end faces for allowing radial constriction and expansion of said collet; (iii) an inner toothed surface defining a collet inner diameter; and, (iv) first and second bite-teeth positioned respectively adjacent said first and second end faces defining said gap, and a third bite-tooth positioned approximately 180° from said gap on said collet inner diameter, said bite-teeth radially inwardly extending and adapted to engage an outer surface of a conduit inserted into said bore whereby upon axial outward movement of said conduit, said frusto-conical surface of said collet bears against said frusto-conical surface of said body inner wall to radially constrict said collet so that said inner-toothed surface firmly engages said conduit outer surface and inhibits withdrawal of said conduit from said bore.

5. The coupling as set forth in claim 4 further comprising:

a fourth bite-tooth positioned approximately 90° from said gap on said collet inner diameters; and, a fifth bite-tooth positioned approximately 270° from said gap on said collet inner diameter.

6. The coupling as set forth in claim 1 wherein said body inner wall includes a circumferential groove formed therein axially between said body first end and said frusto-conical surface of said inner wall, said coupling further comprising an O-ring seal positioned in said groove to prevent the passage of contaminants into said bore between said inner wall and an outer surface of a conduit inserted in said bore.

7. The coupling as set forth in claim 6 wherein said inner wall includes a chamfered surface at said first end of said body to widen an entrance to said bore and facilitate conduit insertion.

8. A double-ended stab-type coupling connecting and providing unobstructed communication between two conduits, said stab-type coupling comprising:

a body including an axially extending bore formed therethrough from a first end to a second end, said bore defined by an inner wall including a central shoulder separating said bore into first and second conduit receiving recesses, and first and second frusto-conical surfaces converging respectively toward said body first and second ends;

first and second radially constrictible and generally annular retaining collets positioned respectively in said first and second recesses, said collets each including an outer frusto-conical surface respectively mating with said first and second frusto-conical surfaces defined by said inner wall and axially movable relative thereto, each collet having an inner toothed surface defining a collet inner diameter and at least two radially inwardly extending and circumferentially spaced-apart bite-teeth defining therebetween a distance less than said collet inner diameter and less than an outer diameter of first and second associated conduits inserted respectively into said first and second recesses such that said bite-teeth of said first and second collets respectively engage an outer surface of said first and second associated conduits during insertion of the first and second conduits into the first and second recesses, respectively, whereby upon axial outward movement of said first and second conduits, said first and second collets move axially therewith so that said frusto-conical surfaces of said first and second collets respectively bear against said first and second frusto-conical surfaces of said body inner wall to radially constrict said first and second collets so that said inner-toothed surface of each of said radially constricted collets firmly engages said outer surface of said first and second associated conduits, respectively, to prevent further withdrawal of said associated conduits from said first and second recesses.

9. The coupling as set forth in claim 8 wherein said at least two bite-teeth of each of said first and second collets are positioned approximately 180° opposite each other on said collet inner diameter.

10. The coupling as set forth in claim 8 wherein each of said first and second generally annular collets includes a circumferential gap defined by first and second end faces, said gap allowing radial constriction and expansion of each of said collets.

11. A double-ended coupling connecting and providing unobstructed communication between two conduits, said coupling comprising:

a body including an axially extending bore formed therethrough from a first end to a second end, said bore defined by an inner wall including a central shoulder separating said bore into first and second symmetrical conduit receiving recesses, and first and second frusto-conical surfaces converging respectively toward said body first and second ends;

first and second radially constrictible and generally annular retaining collets positioned respectively in said first and second recesses, said collets each comprising: (i) an outer frusto-conical surface respectively mating with said first and second frusto-conical surfaces defined by said inner wall and axially movable relative thereto; (ii) an inner toothed surface defining a collet inner diameter; (iii) a circumferential gap defined by first and second end faces for allowing radial constriction and expansion of said collet; (iv) first and second bite-teeth positioned respectively adjacent said first and second end faces defining said gap, and a third bite-tooth positioned approximately 180° from said gap on said collet inner diameter, said bite-teeth radially inwardly extending and adapted to engage an outer surface of a conduit whereby upon axial outward movement of said engaged conduit, said frusto-conical surface of said collet bears against said frusto-conical surface of said body inner wall to radially constrict said collet so that said inner-toothed surface firmly engages said outer surface of said conduit.

12. The coupling as set forth in claim 11 wherein each of said first and second collets further comprises:

a fourth bite-tooth positioned approximately 90° from said gap on said collet inner diameters; and, a fifth bite-tooth positioned approximately 270° from said gap on said collet inner diameter.

13. The coupling as set forth in claim 8 wherein said body inner wall includes a first circumferential groove formed therein axially between said body first and said first frusto-conical surface of said inner wall, and a second circumferential groove formed therein axially between said body second end and said second frusto-conical surface of said inner wall, said coupling further comprising first and second O-ring seals positioned respectively in said first and second grooves to prevent the passage of contaminants into said bore between said inner wall and an outer surface of first and second conduits inserted respectively into first and second recesses.

14. The coupling as set forth in claim 13 wherein said inner wall includes first and second chamfered surfaces at said first and second ends of said body to widen said bore at each end of said body to facilitate conduit insertion.

15. A generally annular retaining collet adapted for use in a stab-type coupling to auto-engage an associated conduit inserted into the stab-type coupling, said collet comprising:

an outer frusto-conical surface;

an inner toothed surface including at least one circumferentially extending tooth defining an inner diameter of the collet; and, at least two inwardly directed and circumferentially spaced-apart bite teeth on said inner diameter, said bite-teeth arranged generally in opposition to each other so as to define therebetween a distance less than said collet inner diameter so that an outer surface of an associated conduit inserted through said inner diameter of said collet is engaged, upon and during insertion into said collet inner diameter, by said at least two inwardly directed and circumferentially spaced-apart bite-teeth.

16. A generally annular retaining collet a comprising:

an outer frusto-conical surface;

an inner toothed surface including at least one circumferentially extending tooth defining an inner diameter of the collet;

first and second end faces defining a circumferential gap in said collet;

first and second radially inwardly directed bite-teeth positioned on opposite circumferential sides of said gap adjacent said first and second end faces, respectively; and, a third radially inwardly directed bite-tooth positioned approximately 180° from said gap on said collet inner diameter.

17. The retaining collet as set forth in claim 16 further comprising fourth and fifth bite-teeth respectively positioned approximately 90° and approximately 270° from said gap on said collet inner diameter.

* * * * *